United States Patent
Xu et al.

(10) Patent No.: US 10,701,472 B1
(45) Date of Patent: Jun. 30, 2020

(54) EARBUD CHARGING CASE

(71) Applicant: Bose Corporation, Framingham, MA (US)

(72) Inventors: Zhen Xu, Ashland, MA (US); Donna Marie Sullivan, Millbury, MA (US); Abby Tilton, Waltham, MA (US); Daniel H. Sargent, Wayland, MA (US); Richard Arthur Grebe, Stow, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/241,318

(22) Filed: Jan. 7, 2019

(51) Int. Cl.
  *H04R 1/10* (2006.01)
  *H01R 13/62* (2006.01)
  *H02J 7/00* (2006.01)

(52) U.S. Cl.
  CPC ....... *H04R 1/1025* (2013.01); *H01R 13/6205* (2013.01); *H02J 7/0044* (2013.01); *H02J 7/0045* (2013.01); *H04R 1/1016* (2013.01)

(58) Field of Classification Search
  CPC ............... H04R 1/1025; H04R 1/1016; H01R 13/6205; H02J 7/0044; H02J 7/0045
  USPC ........................................................ 381/323
  See application file for complete search history.

(56) References Cited

U.S. PATENT DOCUMENTS

| | | | |
|---|---|---|---|
| 2010/0320961 A1* | 12/2010 | Castillo ................. | H04R 1/105 320/107 |
| 2017/0093079 A1* | 3/2017 | Wagman ................ | A45C 13/02 |
| 2017/0195770 A1* | 7/2017 | Cheney ................ | H04R 1/1025 |
| 2018/0064224 A1* | 3/2018 | Brzezinski ............ | A45C 11/24 |
| 2019/0069066 A1* | 2/2019 | Song ........................ | H01F 7/02 |

* cited by examiner

Primary Examiner — Sean H Nguyen
(74) Attorney, Agent, or Firm — Brian M. Dingman; Dingman IP Law, PC (57) ABSTRACT

A charging case for an earbud that has a pair of charging contacts that are configured to pass electrical power to an earbud battery. The charging case includes a raised pedestal, a pair of conductive charging pins protruding from the pedestal, and a docking magnet protruding from the pedestal proximate the charging pins.

18 Claims, 10 Drawing Sheets

EARBUD CHARGING CASE

BACKGROUND

This disclosure relates to a case that can be used to charge the batteries of earbuds.

Earbuds can have rechargeable batteries. Some earbuds are designed to have their batteries recharged while they are stored in an earbud storage case.

SUMMARY

All examples and features mentioned below can be combined in any technically possible way.

In one aspect, a charging case for an earbud that comprises a pair of charging contacts that are configured to pass electrical power to an earbud battery includes a raised pedestal, a pair of conductive charging pins protruding from the pedestal, and a docking magnet protruding from the pedestal proximate the charging pins.

Examples may include one of the above and/or below features, or any combination thereof. The pedestal may have a domed top. The charging pins may protrude from the domed top of the pedestal. The docking magnet may protrude from the domed top of the pedestal. The docking magnet may be located between the charging pins.

Examples may include one of the above and/or below features, or any combination thereof. The charging pins and the docking magnet may each protrude from a top of the pedestal, and the docking magnet may be located between the charging pins. The docking magnet may have a non-circular cross-section and a distal end that is spaced farthest from the top of the pedestal. The docking magnet distal end may comprise a chamfer. The earbud may further comprise an earbud docking magnet located between the charging contacts. The earbud docking magnet may have an upper surface located below an upper surface of the charging contacts. The earbud docking magnet upper surface may be located below a surface of the earbud, to define a cavity that is configured to receive the charging case docking magnet.

Examples may include one of the above and/or below features, or any combination thereof. The charging pins may each comprise a spring that provides compliance to the charging pin. The charging case may further comprise an earbud-receiving trough proximate the raised pedestal and configured to receive the earbud such that the earbud charging contacts are electrically coupled to the charging pins.

Examples may include one of the above and/or below features, or any combination thereof. The charging case may further comprise a case bottom and a case top, a hinge configured to allow the top to pivot open and closed relative to the bottom, a helical torsion spring coupled to the case top and bottom and configured to separate the top from the bottom, and a latch in the case bottom and configured to releasably hold the top closed on the bottom. The charging case may further comprise an elastomeric damping member proximate the hinge and in an interference fit with the case top, to damp the opening of the case. The charging case may further comprise a well in the case bottom and that encompasses the latch, to inhibit water from entering the case bottom.

In another aspect, a charging case for an earbud that comprises a pair of charging contacts that are configured to pass electrical power to an earbud battery, and an earbud docking magnet having an upper surface located below an upper surface of the charging contacts and below a surface of the earbud, to define a receiving cavity, includes a raised pedestal comprising a domed top, a pair of conductive charging pins protruding from the domed top of the pedestal, and a charging case docking magnet protruding from the domed top of the pedestal, wherein the charging case docking magnet has a non-circular cross-section and a distal end that is spaced farthest above the domed top of the pedestal, and wherein the charging case docking magnet is configured to be received in the receiving cavity of the earbud.

Examples may include one of the above and/or below features, or any combination thereof. The charging case may further comprise a case bottom and a case top, a hinge configured to allow the top to pivot open and closed relative to the bottom, a helical torsion spring coupled to the case top and bottom and configured to separate the top from the bottom, a latch in the case bottom and configured to releasably hold the top closed on the bottom, and an elastomeric damping member proximate the hinge and in an interference fit with the case top, to damp the opening of the case. The charging case may further comprise a well in the case bottom and that encompasses the latch, to inhibit water from entering the case bottom. The distal end of the charging case docking magnet and the upper surface of the earbud docket magnet may both have the same cross-sectional shape.

DETAILED DESCRIPTION

Earbuds with rechargeable batteries require a battery-charging device. In some examples the earbud storage case is also used as a battery charger, so the batteries are recharged while the earbuds are stored in the case. Earbuds typically include a pair of closely-spaced charging contacts. The case is designed with charging contacts that are configured to electrically couple to the earbud charging contacts when the earbuds are placed into the case.

Earbuds are sometimes used in situations where they pick up moisture, for example precipitation or perspiration. When the earbuds are placed into the case for charging, moisture can short the contacts. It is desirable to inhibit any moisture on the earbud from shorting the charging contacts of the earbud case.

Figure 1A:
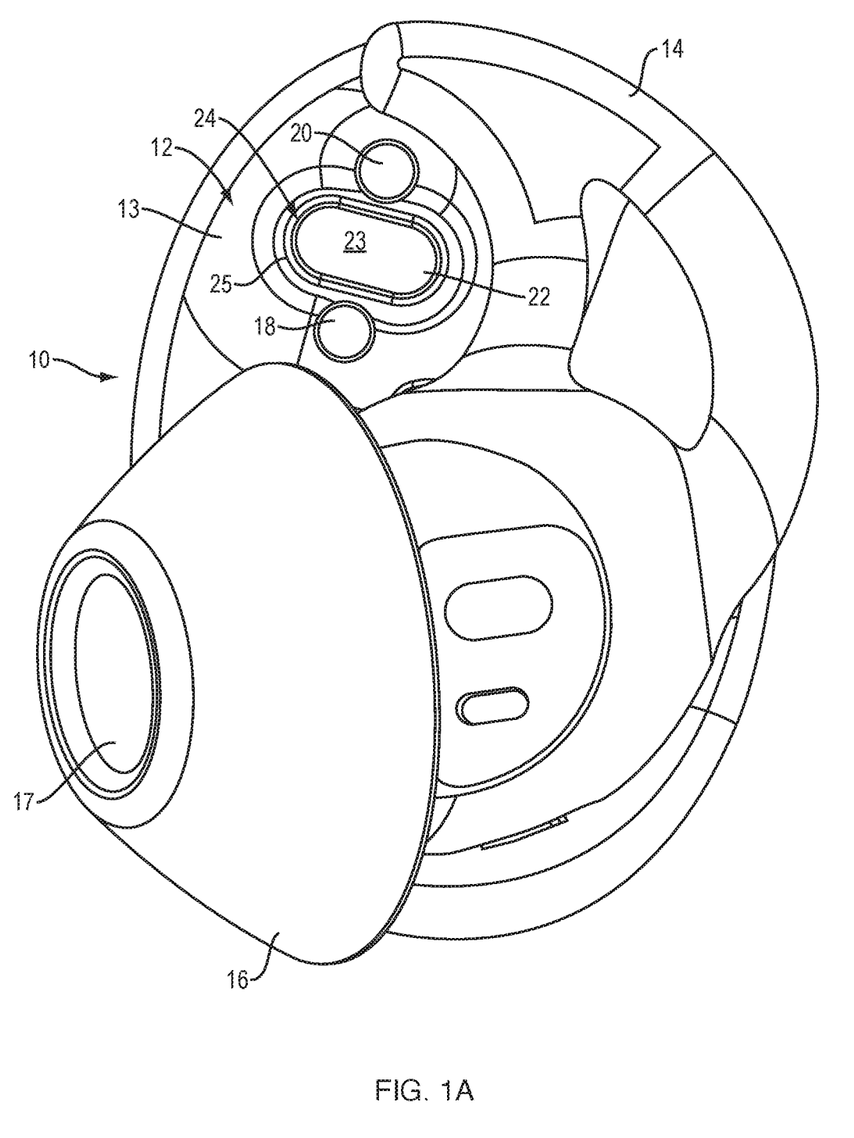
FIG. 1A is a top view of an earbud configured for the right ear.

FIG. 1A is a top view of in-ear headphone, earphone, or earbud 10. Earphone 10 includes body 12 that houses the active components of the earbud. Body 12 has outer surface 13. Ear tip portion 16 is coupled to body 12 and is pliable so that it can be inserted into at least the entrance of the user's ear canal. Sound is delivered through opening 17. Retaining loop 14 is constructed and arranged to be positioned in the outer ear, for example in the antihelix, to help retain the earbud in the ear. Earphones and earbuds are well known in the field (e.g., as disclosed in U.S. Pat. Nos. 9,854,345 and 8,989,427, the disclosures of which are incorporated herein by reference in their entirety and for all purposes), and so certain details of the earbud are not further described herein. An earbud is an example of an earphone according to this disclosure, but is not limiting of the scope, as earphones can also be located on or over the ear, or even on the head near the ear.

Figure 1B:
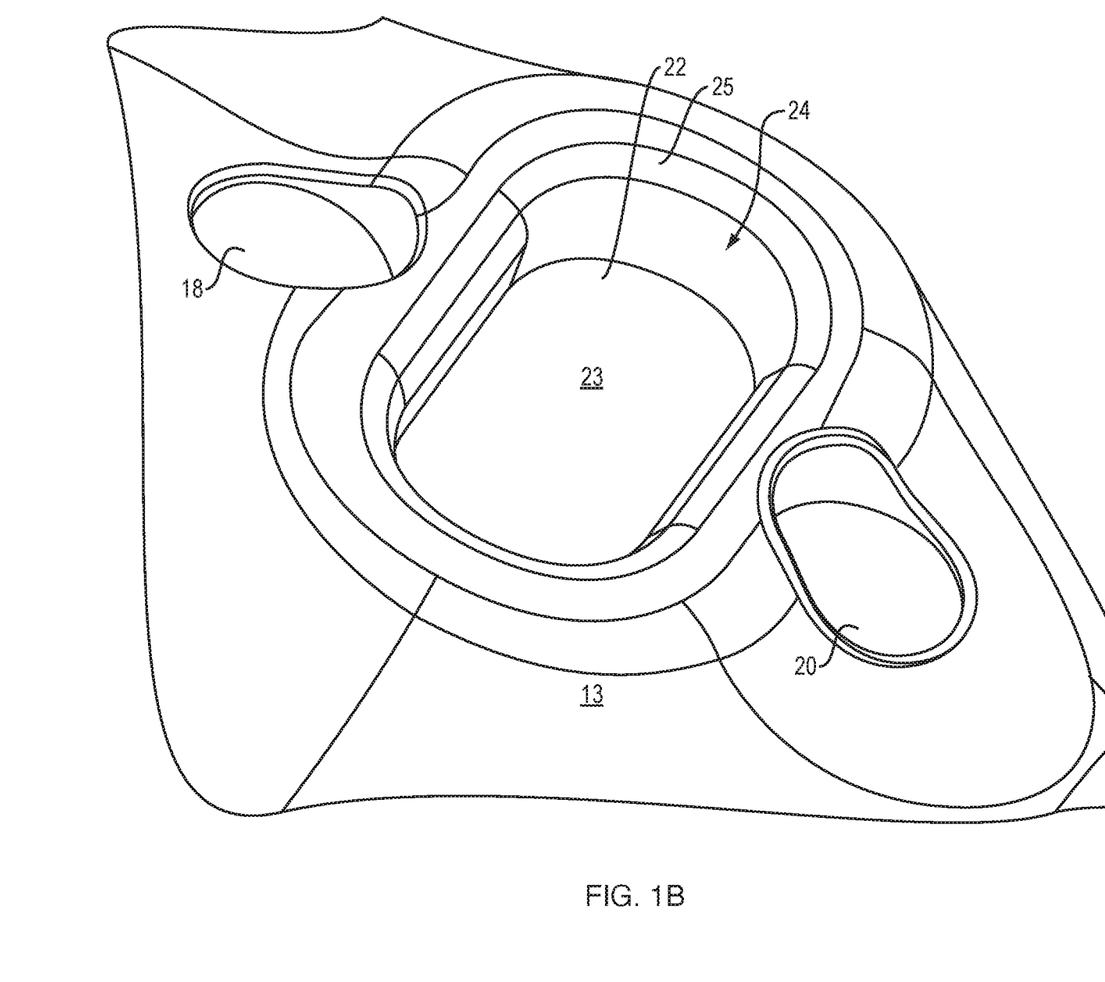
FIG. 1B is a partial close-up view of the charging contacts and docking magnet of the earbud of FIG. 1.
Figure 2:
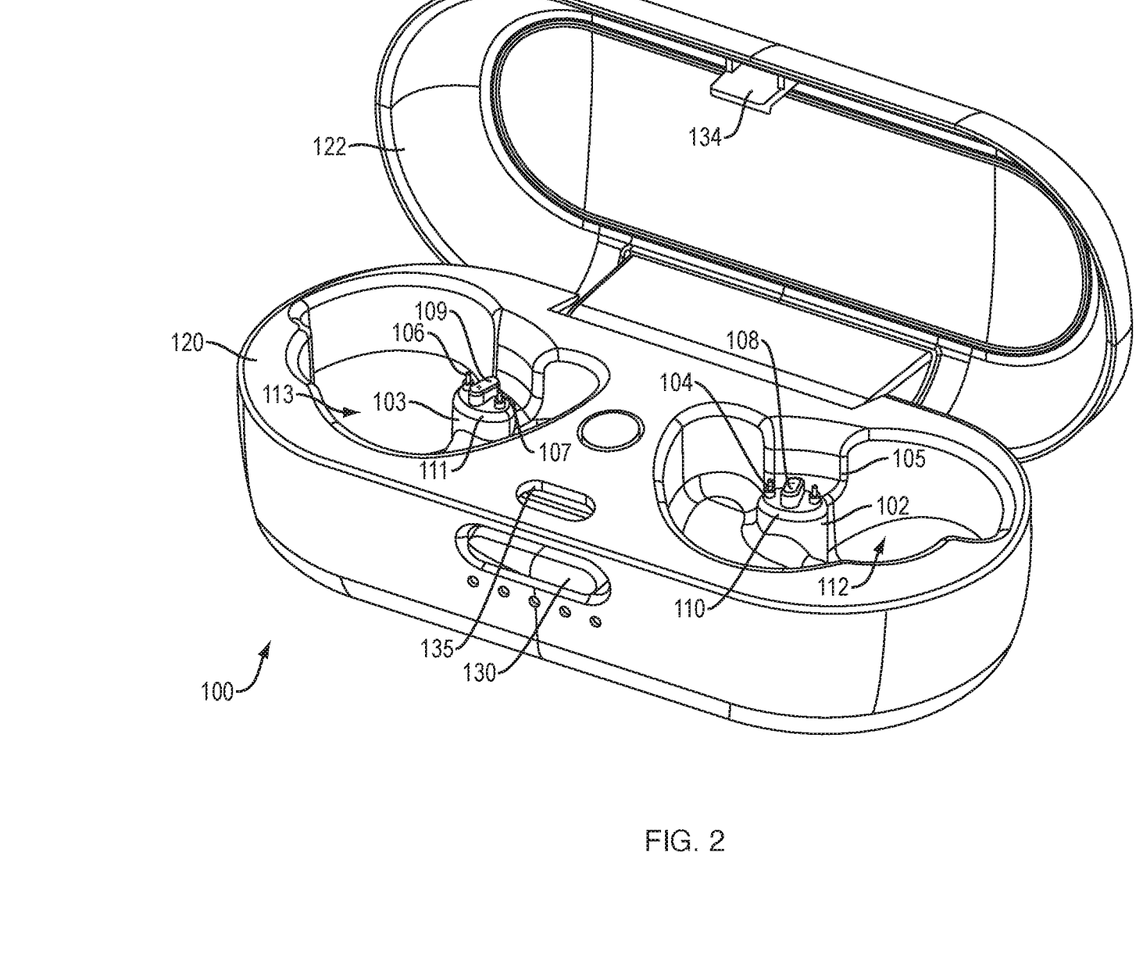
FIG. 2 is a perspective view of a charging case for the earbud of FIGS. 1A and 1B.

The battery (not shown) in earbud 10 is charged via charging contacts 18 and 20, as is known in the art. A docking magnet 22 can be used to couple earbud 10 to a battery charging device (not shown) such that charging contacts 18 and 20 make an electrical connection with the corresponding charging contacts of the battery charging device. Docking magnet 22 can be located between contacts 18 and 20 to help the docking magnet to more uniformly pull contacts 18 and 20 into the contacts of the battery charging device. In the present instance, as shown in FIG. 1B, the top surface 23 of docking magnet 22 is located below surface 13 of earbud body or housing 12. Housing cavity 24, located above docking magnet upper exposed surface 23, can help to guide a corresponding docking magnet of the charging case (described below) into proper mating contact with magnet 22. Proper alignment and mating of the magnets is facilitated by creating a chamfer 25 at the opening to cavity 24, also as is further explained below.

Figure 3A:
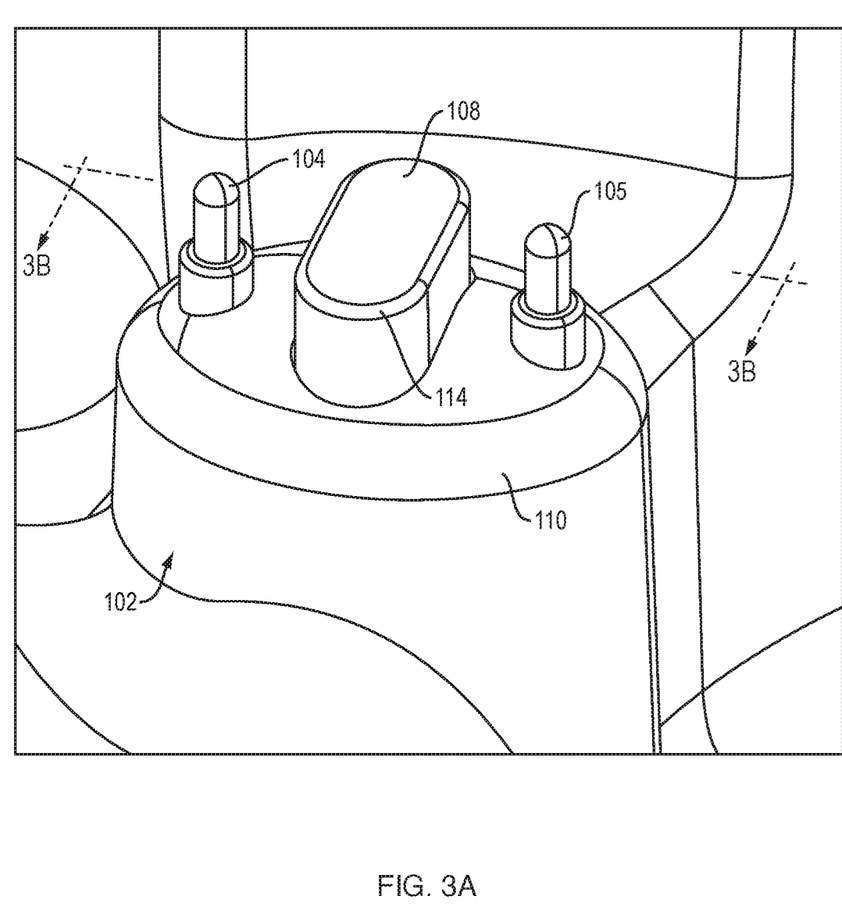
FIG. 3A is a partial close-up view of the charging pins and docking magnet of the case of FIG. 2, for the earbud of FIGS. 1A and 1B.
Figure 3B:
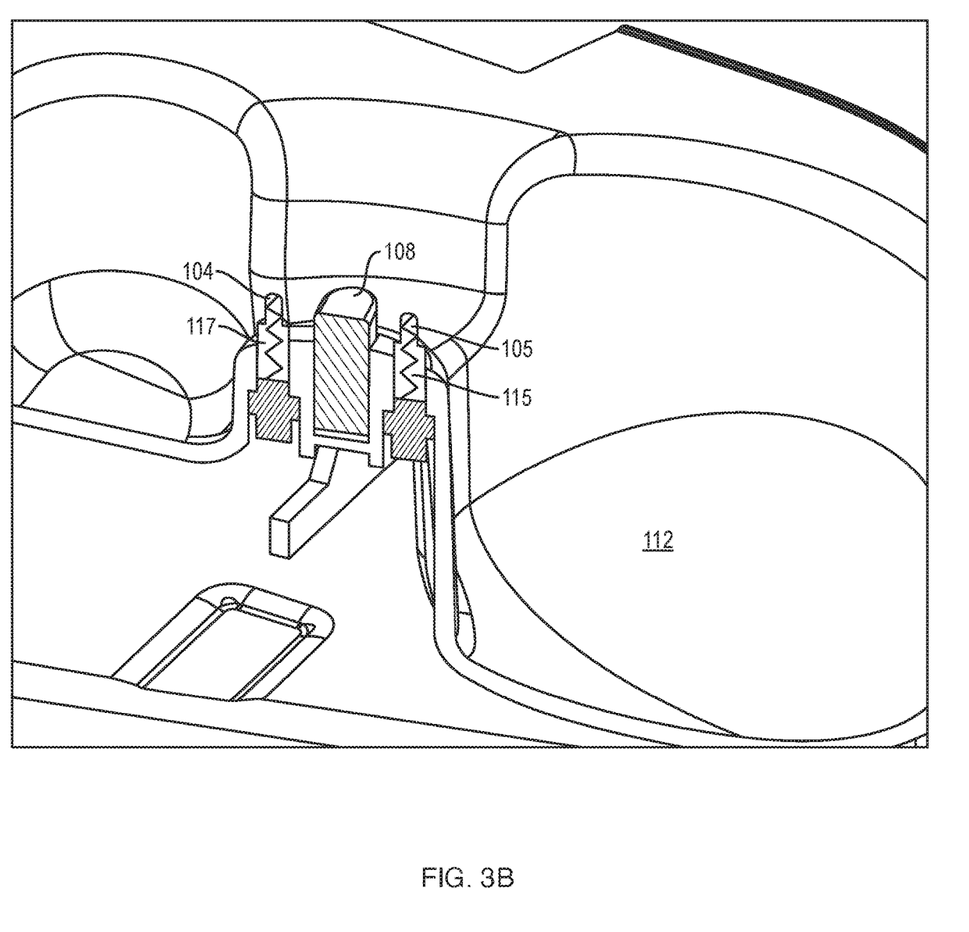
FIG. 3B is a cross-sectional view taken along line 3B-3B of FIG. 3A.
Figure 4:
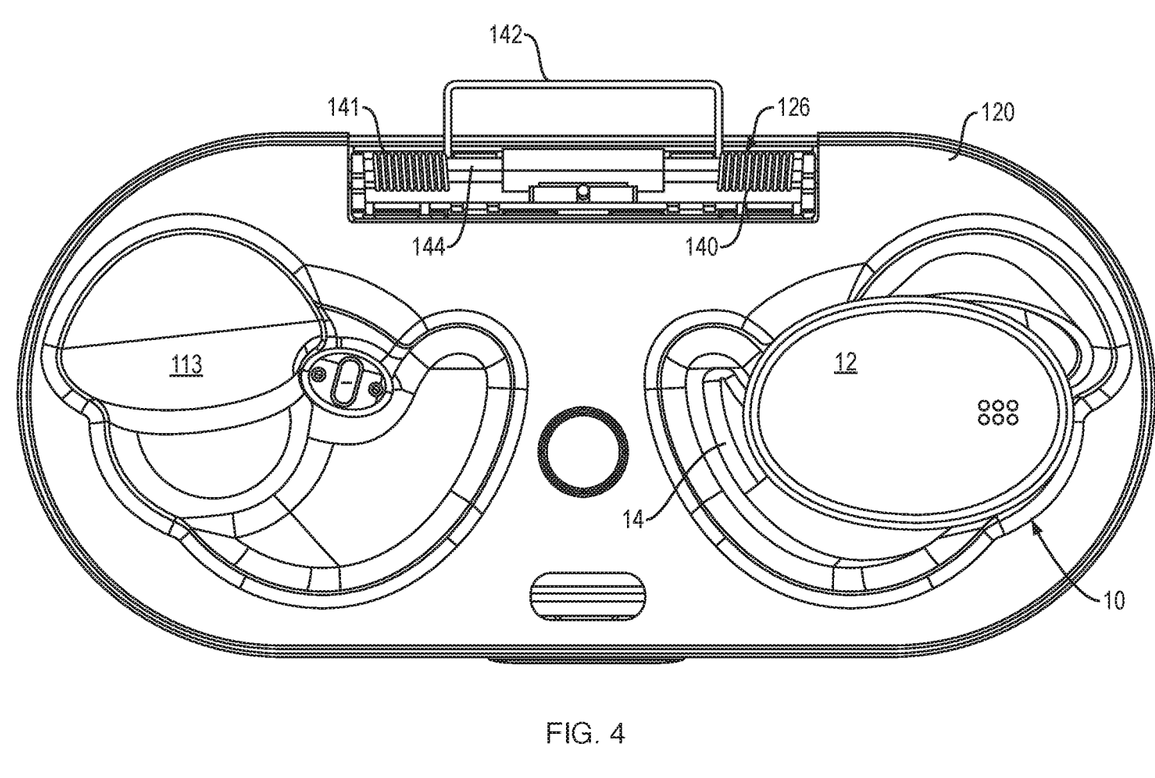
FIG. 4 is a top view of the bottom part of the charging case of FIG. 2.
Figure 5:
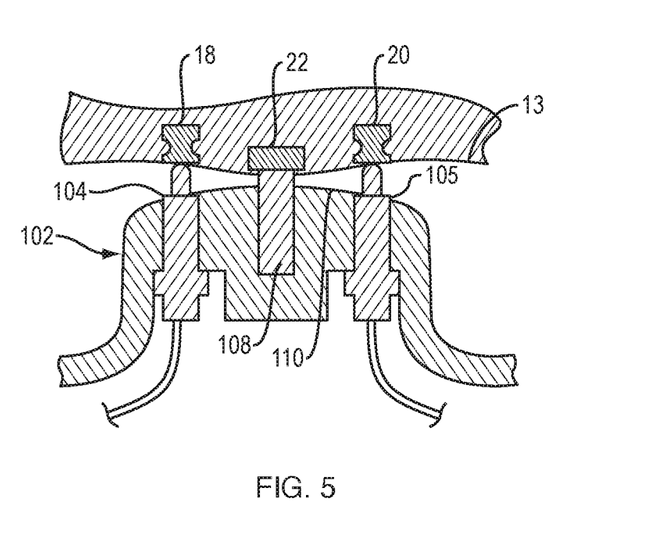
FIG. 5 is a partial cross-sectional view of an earbud docked to the charging pins and docking magnet of a charging case.

A non-limiting example of a charging case 100 is depicted in FIGS. 2-8. Charging case 100 comprises bottom 120 and top 122, each of which can comprise an injection-molded shell with other features added to the shells. Top 122 is connected to bottom 120 by a hinge. A latch system (described below) holds the top closed on the bottom. Case 100 includes troughs 112 and 113 that are configured to fit one of the left and right earbuds into a trough, with the battery charging elements of the earbud properly aligned with and in electrical contact with the battery charging elements of the case. FIG. 4 shows right earbud 10 located in case trough 112.

Case 100 includes charging pins 104 and 105 for the right earbud, and charging pins 106 and 107 for the left earbud. The charging pins protrude from a raised pedestal; pedestal 102 for the right earbud and pedestal 103 for the left earbud. Pedestal 102 has domed top 110 and pedestal 103 has domed top 111. Docking magnets 108 and 109 protrude from the tops of pedestals 102 and 103, respectively. The docking magnets are close to the pins. In this non-limiting example, the docking magnet is located between the two charging pins of the pair of pins for the earbud. Details of case 100 for the right earbud are shown in detail in several figures, it being understood that these details are essentially identical for the left earbud. Docking is accomplished at least in part by magnetic attraction of the earbuds to the charging case. Magnetic attraction can be accomplished with one magnet, or an array of magnets, in both the earbuds and the case. Alternatively, magnetic attraction can be accomplished with magnet(s) in only one of the earbuds and case, and ferromagnetic material in the other of the earbuds and case.

As shown in FIGS. 3A and 3B, the top 110 of pedestal 102 is curved or domed. One result of the domed top is that if any moisture carried by the earbud contacts pedestal 102, the doming will help to drain the moisture away from charging pins 104 and 105, down into trough 112. Moisture is thus less likely to short pins 104 and 105. Pins 104 and 105 are preferably spring-loaded pins with vertical compliance (such as pogo pins). Springs 115 and 117 are shown in FIG. 3B. When the earbud is seated in the case, the earbud charging contacts electrically couple to the charging pins of the case. See FIG. 5, wherein charging contacts 18 and 20 touch the tops of charging pins 104 and 105. Docking magnet 108 protrudes above the top 110 of pedestal 102. The non-circular shapes (identical oval shapes in this non-limiting example) of docking magnets 108 and 22 and the fact that top 23 of magnet 22 is below earbud housing surface 13 help in proper alignment. Chamfered cavity 24 and chamfered top edge 114 of magnet 108 help to guide magnet 108 into contact with magnet 22. The exposed tops of contacts 18 and 20 are configured such that when magnets 108 and 22 are in contact, pogo pins 104 and 105 are sufficiently compressed such that they will pass battery charging current into contacts 18 and 20.

Figure 6:
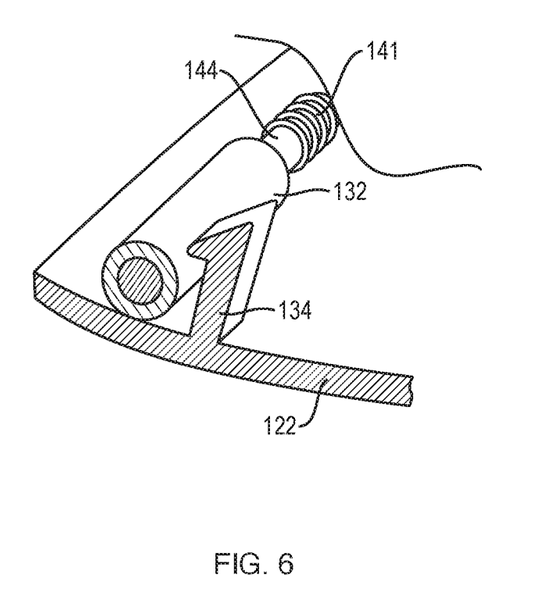
FIG. 6 is a partial cross-sectional view of the engagement of the top of the charging case with a damping member of the bottom of the charging case.
Figure 7:
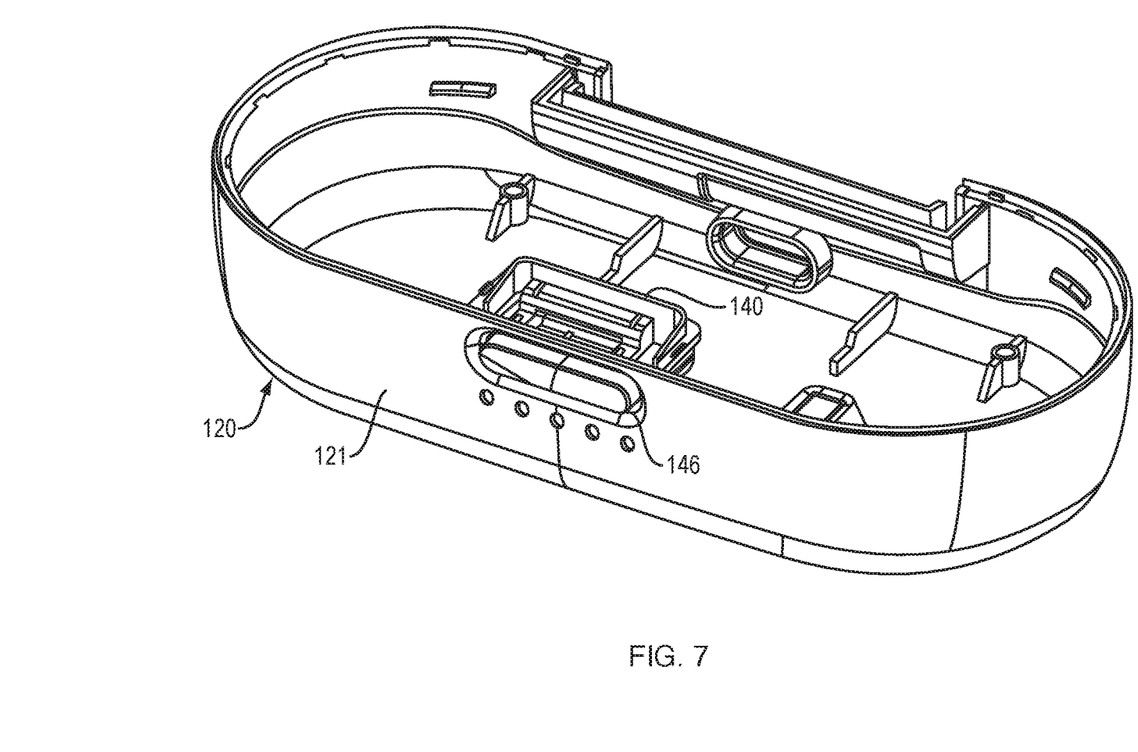
FIG. 7 is a perspective view of the shell of the bottom of the charging case.
Figure 8:
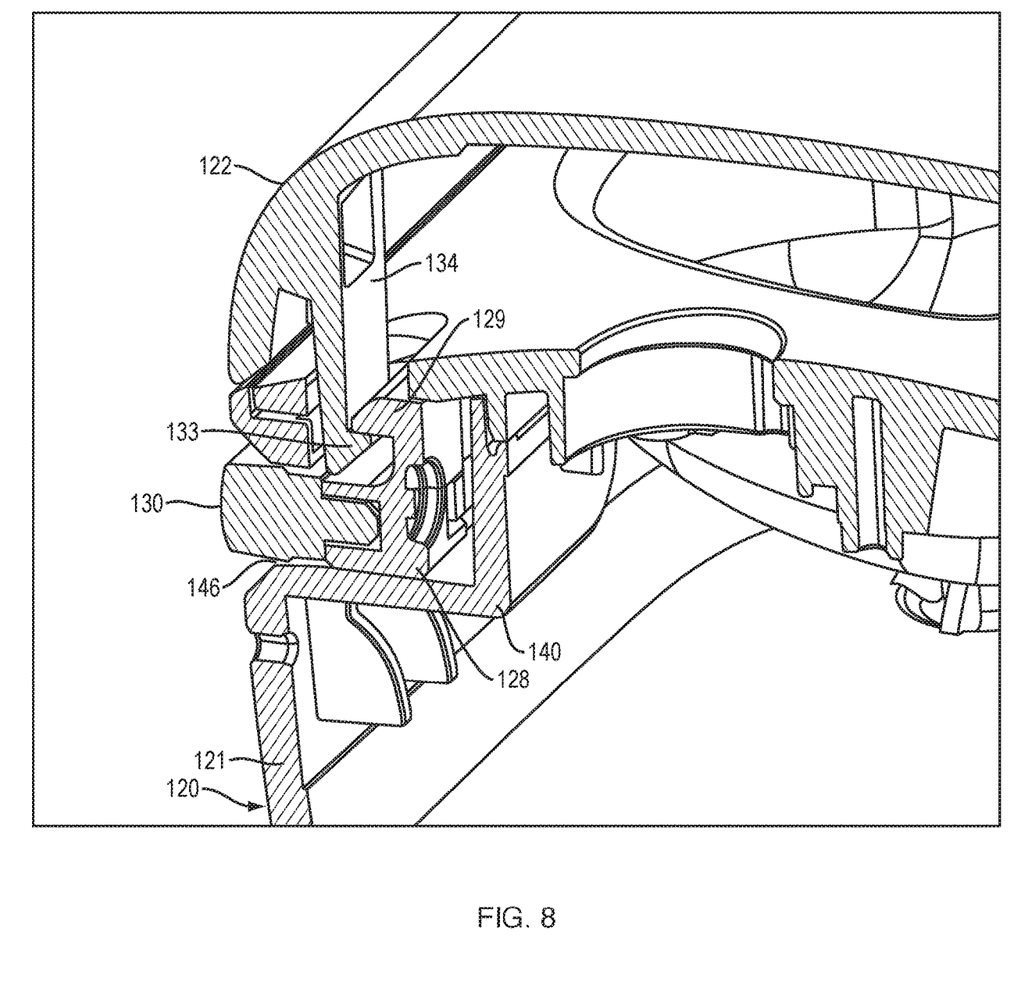
FIG. 8 is a partial, cross-sectional view of the charging case top engaged with the charging case bottom.

Case 100 is configured such that top 122 opens by pushing in on latch operator 130 that sits in case bottom opening 146. This pushes latch 128 (see FIG. 8) back such that its top 129 is free of catch 133 on the end of tongue 134 that fits into opening 135. Returning to FIG. 4, the opening is assisted with spring 126 that comprises helical portions 140 and 141 that are mounted on hinge pin 144. Integral connector element 142 of spring 126 is coupled to case top 122. Spring 126 is configured such that when the latch is released top 122 pivots to the open position shown in FIG. 2. The spring-assisted opening can be made to be more controlled and smoother by damping the opening action. Damping is accomplished in this non-limiting example with damping member 132 (e.g., an elastomeric tube) carried on pin 144 (see FIG. 6). Case top 122 can have a portion 134 that is in an interference fit with damping member 132, as shown in FIG. 6. This interference slows and smoothes the opening of the case.

Case 100 also includes features that inhibit water ingress into the closed case, which can further inhibit moisture-related electrical problems with the case and the earbuds. Latch operator opening 146 can be a means for water to enter the closed case. Water infiltration via opening 146 is inhibited with well 140 that is molded as an integral part of shell 121 of case bottom 120. Well 140 encompasses latch 128. See FIGS. 7 and 8. Any water entering through opening 146 will pool in well 140 rather than entering the rest of the case bottom and potentially affecting case charging features.

A number of implementations have been described. Nevertheless, it will be understood that additional modifications may be made without departing from the scope of the inventive concepts described herein, and, accordingly, other examples are within the scope of the following claims.

What is claimed is:

1. A charging case for an earbud that comprises a pair of charging contacts that are configured to pass electrical power to an earbud battery, the charging case comprising:
 a raised pedestal with a top;
 a pair of conductive charging pins protruding from the top of the pedestal; and
 a docking magnet protruding from the top of the pedestal between the charging pins.

2. The charging case of claim 1, wherein the top of the pedestal is domed.

3. The charging case of claim 1, wherein the docking magnet is located between the charging pins.

4. The charging case of claim 1, wherein the docking magnet has a non-circular cross-section and a distal end that is spaced farthest from the top of the pedestal.

5. The charging case of claim 4, wherein the docking magnet distal end comprises a chamfer.

6. The charging case of claim 4, wherein the earbud further comprises an earbud docking magnet located between the charging contacts.

7. The charging case of claim 6, wherein the earbud docking magnet has an upper surface located below an upper surface of the charging contacts.

8. The charging case of claim 7, wherein the earbud docking magnet upper surface is located below a surface of the earbud, to define a cavity that is configured to receive the charging case docking magnet.

9. The charging case of claim 1, wherein the charging pins each comprise a spring that provides compliance to the charging pin.

10. The charging case of claim 1, further comprising an earbud-receiving trough proximate the raised pedestal and configured to receive the earbud such that the earbud charging contacts are electrically coupled to the charging pins.

11. The charging case of claim 1, further comprising:
   a case bottom and a case top;
   a hinge configured to allow the top to pivot open and closed relative to the bottom;
   a helical torsion spring coupled to the case top and bottom and configured to separate the top from the bottom; and
   a latch in the case bottom and configured to releasably hold the top closed on the bottom.

12. The charging case of claim 11, further comprising an elastomeric damping member proximate the hinge and in an interference fit with the case top, to damp the opening of the case.

13. The charging case of claim 1, further comprising a well in the case bottom and that encompasses the latch, to inhibit water from entering the case bottom.

14. A charging case for an earbud that comprises a pair of charging contacts that are configured to pass electrical power to an earbud battery, and an earbud docking magnet having an upper surface located below an upper surface of the charging contacts and below a surface of the earbud, to define a receiving cavity, the charging case comprising:
   a raised pedestal comprising a domed top;
   a pair of conductive charging pins protruding from the domed top of the pedestal; and
   a charging case docking magnet protruding from the domed top of the pedestal, wherein the charging case docking magnet has a non-circular cross-section and a distal end that is spaced farthest above the domed top of the pedestal, and wherein the charging case docking magnet is configured to be received in the receiving cavity of the earbud.

15. The charging case of claim 14, further comprising:
   a case bottom and a case top;
   a hinge configured to allow the top to pivot open and closed relative to the bottom;
   a helical torsion spring coupled to the case top and bottom and configured to separate the top from the bottom;
   a latch in the case bottom and configured to releasably hold the top closed on the bottom; and
   an elastomeric damping member proximate the hinge and in an interference fit with the case top, to damp the opening of the case.

16. The charging case of claim 15, further comprising a well in the case bottom and that encompasses the latch, to inhibit water from entering the case bottom.

17. The charging case of claim 14, wherein the distal end of the charging case docking magnet and the upper surface of the earbud docket magnet both have the same cross-sectional shape.

18. A charging case for an earbud that comprises a pair of charging contacts that are configured to pass electrical power to an earbud battery, the charging case comprising:
   a raised pedestal with a top;
   a pair of conductive charging pins protruding from the top of the pedestal; and
   a docking magnet protruding from the top of the pedestal in a location that is adjacent to both of the pair of charging pins.

\* \* \* \* \*